Nov. 10, 1953  E. G. ANDERSON  2,658,711
SELF-PROTECTING VALVE
Filed March 28, 1951
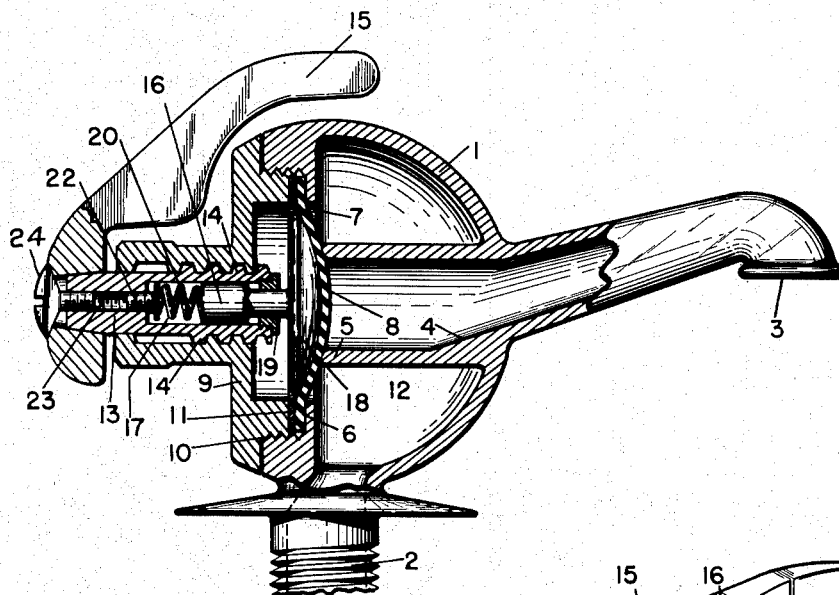
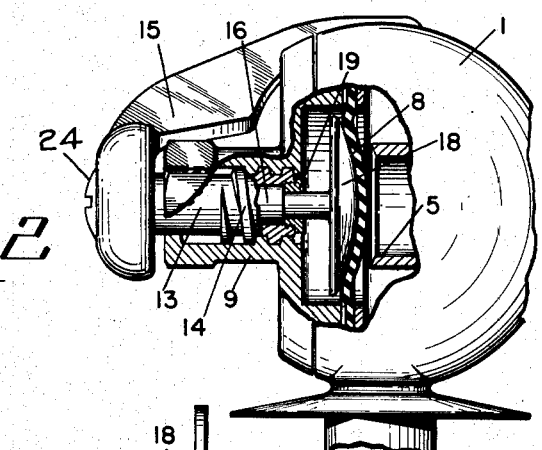
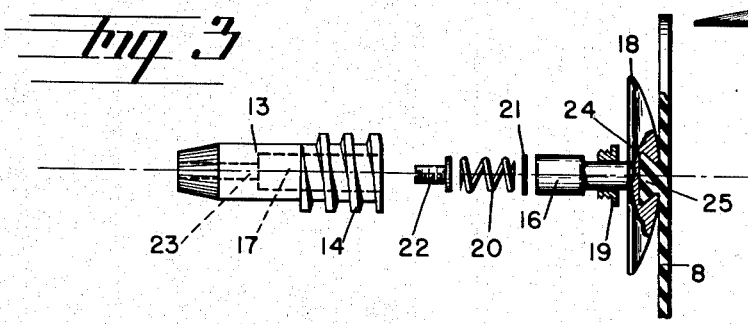
INVENTOR.
ELMER G. ANDERSON
BY
*H. L. Godfrey*
ATTORNEY Patented Nov. 10, 1953

2,658,711

UNITED STATES PATENT OFFICE 2,658,711

SELF-PROTECTING VALVE

Elmer G. Anderson, Portland, Oreg.

Application March 28, 1951, Serial No. 218,054

2 Claims. (Cl. 251—24)

(Granted under Title 35, U. S. Code (1952), sec. 266)

The invention described herein may be manufactured and used by or for the Government of the United States for governmental purposes without the payment of any royalty thereon in accordance with the provisions of the act of March 3, 1883 (22 Stat. 625), as amended by the act of April 30, 1928 (45 Stat. 467, 35 U. S. C., 1946 Ed. Sec. 45).

This invention relates to valves, especially to valves in which an elastic diaphragm is used in connection with a valve seat as a closing mechanism. A typical field of application for valves of this kind is in hand-operated valves such as those used in lavatory fixtures. This application is a continuation-in-part of my copending application for patent on a diaphragm valve, No. 18,189, filed March 31, 1948, now abandoned, from which it differs, however, in some important ways.

The object of this invention is primarily to provide in a valve means for preventing shock or "water hammer" which is usually associated with valves when they are closed quickly. Another object is to provide means for protecting the valve itself from shock or damage when closed suddenly. Another object is to provide means for slowing up the flow of fluid through the valve gradually regardless of the rapidity of closing of the valve. Another object is to provide means for preventing oscillation or fluttering of the valve closing elements when the flow through the valve is irregular. Another object is to provide the flexibility required in the valve for preventing shock and at the same time to prevent leakage.

What constitutes my present invention is described in the specifications following in reference to the accompanying drawing and succinctly defined in the appended claims.

In the drawing, Fig. 1 is a section principally along the longitudinal axis of a preferred form of embodiment of the essential features of my invention.

Fig. 2 is a partial section of some of the same parts shown in Fig. 1, but in a partly open position for comparison with Fig. 1 which shows the parts in closed position.

Fig. 3 is a dissected view of shock-absorbing parts of my invention shown in Fig. 1, including an additional sectionalized view supplementing the section shown in Fig. 1.

Referring to Fig. 1, my invention consists of a valve body 1 with an inlet 2 and an outlet. The outlet, shown for example as a spout 3 extends into the body of the valve in a channel 4 terminating in a valve seat 5. An annular ledge or shoulder 6 is formed inside the valve body to provide an opening 7 best shown in Fig. 1 surrounding the valve seat 5.

A soft, yielding diaphragm 8 is clamped against the ledge 6 by a valve closure cap 9 which is threaded into the valve body 1 at 10. A gasket 11 is clamped between cap 9 and shoulder 6 to hold diaphragm 8. Diaphragm 8 is sealed against shoulder 6 by gasket 11 so that liquid cannot pass from the interior 12 of valve body 1 past diaphragm 8 into the interior of cap 9.

A valve stem 13 with threads 14 is operated by the conventional handle 15. A plunger 16 is carried in a hole 17 in valve stem 13. Plunger 16 is enlarged at the outer end, preferably into a rounded or mushroom-shaped surface 18 which is in contact with diaphragm 8. Plunger 16 is held in hole 17 by a retaining ring 19 against the pressure of a spring 20. A washer 21 is optionally provided at the end of spring 20. An adjusting screw 22 is threaded into the bottom of hole 17 at the location 23 in stem 13.

The rounded surface 18 of plunger 16 is, under some circumstances, hollowed out in the center to provide a holding recess 24 into which a projection 25 fits. Other convenient arrangements for securing the center of diaphragm 8 to the center of plunger surface 18 such as a conventional machine screw can also be used.

In the design of this valve the portion of the area of diaphragm 8 exposed outside the circumference of valve seat 5 is proportioned to fulfill three conditions. One is to provide ample flexibility in diaphragm 8 to avoid excessive stress and fatigue in repeated bending incidental to opening and closing the valve. Another is to provide a cross-sectional channel area around seat 5 substantially equivalent to that inside seat 5 for carrying the valve flow without undue restriction. The other is to provide an area of diaphragm subject to the pressure of fluid in the interior 12 of valve body 1 sufficient to develop a considerable force for opposing the pressure of spring 20 when the valve is closed.

Spring 20 is designed to be appropriate to the fluid pressure in the valve. The strength of spring 20 should be sufficient to hold diaphragm 8 down on seat 5 to close the valve under normal pressure conditions. Then if the valve is closed quickly and a pressure surge is developed, the increased force on diaphragm 8 overcomes the force of spring 20 and holds the diaphragm off the seat 5 momentarily permitting some leakage of fluid thus relieving the pressure surge. A valve when changed from one pressure to another may need to have different springs 20, each designed for the pressure with which it is to be used. For example, if spring 20 and diaphragm 8 are in balance for operation at 50 pounds per square inch working pressure, and the working pressure is increased to 100 pounds per square inch, spring 20 will have to be increased in strength to avoid leakage if the valve is to permit the relief of pressure surges of less than twice the normal pressure.

Relatively small changes in working pressure and relatively small changes in relief pressure can be accomplished by adjusting screw 22 by turning it in the threads inside 23 of valve stem 13. The threaded end of screw 22 is slotted for a screwdriver as shown in Fig. 3. Thus screw 22 can be adjusted with a screw driver through the inside 23 of valve stem 13 by removing screw 24 which holds handle 15 in place on valve stem 13.

The suppression of oscillation resulting from water hammer in the valve is aided by plunger 16 which fits closely in hole 17 in valve stem 13. Plunger 16, when lubricated by oil, grease, or water in hole 17 acts as a dashpot when moved by pressure of spring 20 or diaphragm 8. The kind of oscillation often occurring in valves of ordinary construction, especially when the parts are loosely fitted is prevented by the dashpot or damping action of plunger 16 as it moves against the inelastic resistance of fluid escaping between the plunger and the containing wall. The combination of spring 20 and plunger 16 provides complete impulse relief and damping, the spring permitting movement of diaphragm and opening of the valve in response to excess pressure and plunger 16 absorbing energy which could contribute to oscillation.

I claim:

1. In a valve, the combination of a valve seat, a flexible diaphragm closure member thereof, a valve stem provided with a concentric dash-pot chamber, a spring-loaded plunger operable within said dash-pot to move for a limited distance in axial relation to said valve-stem and operable upon said flexible diaphragm closure member to urge said flexible diaphragm closure member toward said valve seat, said dash-pot being fluid-filled to provide a damping action upon movement of said plunger, and means for moving said valve stem toward and away from said valve seat.

2. In a valve, the combination of a valve seat, a flexible diaphragm closure member therefor, a valve stem having a concentric dash-pot chamber therein, a plunger closely fitted within said dash-pot chamber and adapted to move a limited distance within said chamber in axial relation to said valve stem, said plunger including a shank extending through a liquid-sealed opening in the end of said valve stem toward said valve seat, a head on said shank to engage said flexible diaphragm closure member, resilient means in said dash-pot chamber positioned to urge said plunger toward said valve seat, said dash-pot chamber being liquid-filled to provide a damping action upon movement of said plunger, and means for moving said valve stem toward and away from said valve seat.

ELMER G. ANDERSON.

References Cited in the file of this patent

UNITED STATES PATENTS

| Number | Name | Date |
|---|---|---|
| 731,639 | Walter | June 23, 1903 |
| 1,870,856 | Lynn | Aug. 9, 1932 |
| 1,910,491 | Lynn | May 23, 1933 |

FOREIGN PATENTS

| Number | Country | Date |
|---|---|---|
| 14,189 | Great Britain | of 1904 |
| 254,052 | Switzerland | of 1949 |
| 538,208 | Great Britain | of 1941 |